(12) United States Patent
Skarvan et al.

(10) Patent No.: US 8,936,313 B2
(45) Date of Patent: Jan. 20, 2015

(54) PROTECTIVE BICYCLE SEAT

(71) Applicants: Brian A. Skarvan, Cedarburg, WI (US); Jean C Ringwalt, Carbondale, CO (US); Erik Skarvan, Aspen, CO (US)

(72) Inventors: Brian A. Skarvan, Cedarburg, WI (US); Jean C Ringwalt, Carbondale, CO (US); Erik Skarvan, Aspen, CO (US)

( * ) Notice: Subject to any disclaimer, the term of this patent is extended or adjusted under 35 U.S.C. 154(b) by 0 days.

(21) Appl. No.: 13/786,875

(22) Filed: Mar. 6, 2013

(65) Prior Publication Data

US 2013/0270876 A1 Oct. 17, 2013

Related U.S. Application Data

(60) Provisional application No. 61/623,285, filed on Apr. 12, 2012.

(51) Int. Cl.
*A47C 31/00* (2006.01)
*B62J 1/20* (2006.01)

(52) U.S. Cl.
CPC .................................. *B62J 1/20* (2013.01)
USPC ................. 297/219.11; 297/224; 297/228.11; 297/228.12; 297/228.13

(58) Field of Classification Search
CPC ..................................... B62J 1/18; B62J 1/20
USPC .................. 297/219.11, 224, 228.11, 228.12, 297/228.13
See application file for complete search history.

(56) References Cited

U.S. PATENT DOCUMENTS

| | | | |
|---|---|---|---|
| 536,538 A | 3/1895 | McIntire | |
| 3,008,190 A * | 11/1961 | Mesinger | 264/138 |
| 3,972,539 A | 8/1976 | Mize | |
| 4,451,083 A * | 5/1984 | Marchello | 297/219.11 |
| 4,733,907 A * | 3/1988 | Fellenbaum | 297/188.01 |
| 4,786,104 A * | 11/1988 | Fellenbaum | 297/224 |
| 5,372,169 A * | 12/1994 | Norton et al. | 150/167 |
| 5,676,288 A * | 10/1997 | Spirk | 224/463 |
| 5,795,009 A * | 8/1998 | Sack et al. | 296/78.1 |
| 5,890,760 A | 4/1999 | Kirstein | |
| D420,813 S | 2/2000 | Yates | |
| 7,416,250 B1 | 8/2008 | DiFilippo | |
| 2003/0234565 A1* | 12/2003 | McCurdy | 297/219.11 |
| 2005/0110314 A1* | 5/2005 | Buselmeier | 297/219.11 |
| 2008/0169688 A1* | 7/2008 | Funderburg | 297/188.06 |
| 2011/0198903 A1* | 8/2011 | Sebastian | 297/219.11 |
| 2013/0207423 A1* | 8/2013 | Russell et al. | 297/188.2 |

FOREIGN PATENT DOCUMENTS

| | | | | |
|---|---|---|---|---|
| AT | 11408 U1 | * | 8/2010 | |
| EP | 1580103 A1 | * | 9/2005 | |
| FR | 2960753 A1 | * | 12/2011 | |
| GB | 321797 | * | 8/1929 | |
| GB | 2190337 A | * | 11/1987 | B62J 1/20 |
| GB | 2450107 A | * | 12/2008 | B62J 1/20 |
| WO | WO 9408839 A1 | * | 4/1994 | B62J 1/22 |

OTHER PUBLICATIONS

Dry Ride Seat Cover at REI; http://www.rei.com/product/623806; Oct. 7, 2009; 1 page.
XeroCovers—Waterproof Bicycle Seat Covers; http://www.xerocovers.com/store/show_product/4; Oct. 7, 2009; 1 page.

(Continued)

*Primary Examiner* — Laurie Cranmer
(74) *Attorney, Agent, or Firm* — Whyte Hirschboeck Dudek S.C.

(57) ABSTRACT

A removable protective cover for a bicycle saddle that is convertible to a carrying case that can be clipped onto a bicycle frame, a bicycle basket/rack, cable, seat frame, belt loop, backpack, etc., for later use is provided.

14 Claims, 9 Drawing Sheets

(56) References Cited

OTHER PUBLICATIONS

Bicycle Seat Cover; Shanghai Bocal Accessories Co., Ltd.; http://www.alibaba.com/product-gs/238437759/bicycle_seat_cover_pvc_full_color/showimage.html; Oct. 7, 2009; 1 page.

Get Moooving! Bicycle Seat Cover; Vinyl Waterproof Bike Seat Covers for Adults; http://www.uncommongoods.com/item/item.jsp?itemId=17174&utm_medium=cpc&utm_source=yahoo . . . ; Oct. 7, 2009; 1 page.

* cited by examiner

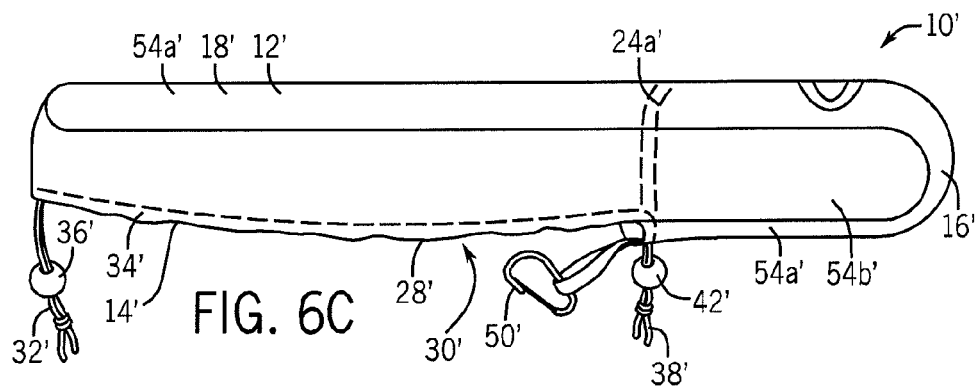
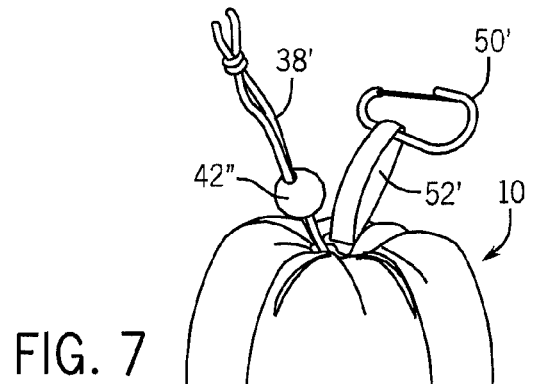
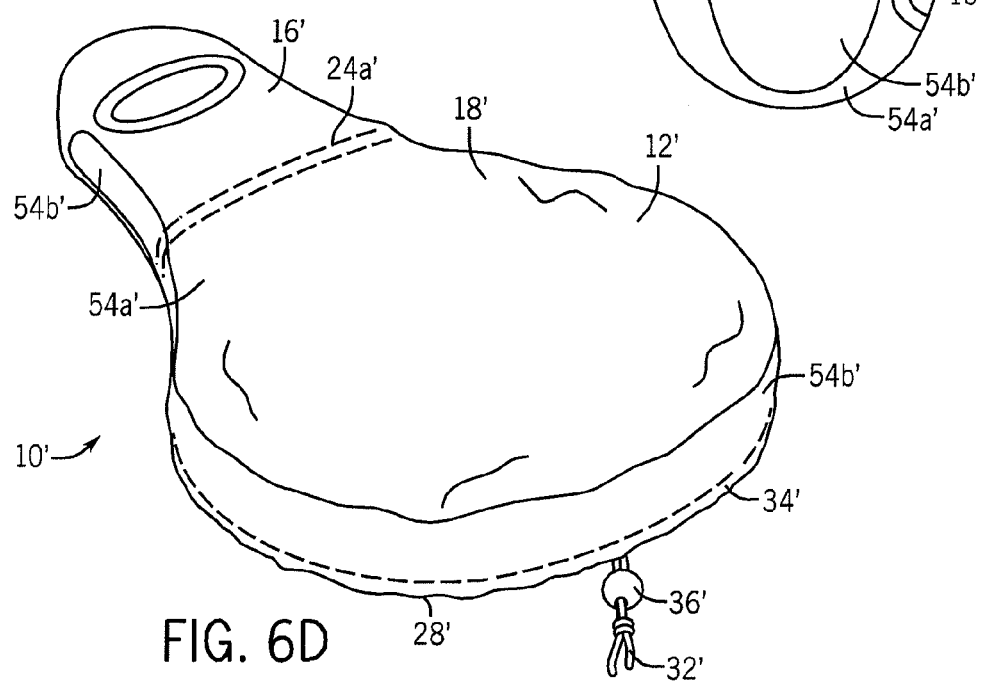

PROTECTIVE BICYCLE SEAT

FIELD OF THE INVENTION

Embodiments of the invention relate to generally to a bicycle accessory device, and more particularly to a removable protective cover for a bicycle saddle that is convertible into a portable carrying case.

BACKGROUND OF THE INVENTION

Cycling has developed into an increasingly popular mode of transportation ranging from leisurely riders to competitive racers. One problem is that without a protective seat cover, a cyclist's bottom side is exposed to an uncomfortable wet ride in rainy conditions. Another issue is the damaging effects to bicycle saddles (including expensive leather saddles) from adverse conditions ranging from UV/sun, rain, snow, sleet, road debris (especially when transporting a bicycle on a vehicle rack), and other environmental pollutants including bird droppings, etc.

In an effort to provide a solution to such problems, covers have been developed that completely cover a bicycle or portions of the bicycle such as the saddle. However, currently available saddle covers fit poorly over the bicycle seat and do not include a feature to readily contain and transport the protective cover

SUMMARY OF THE INVENTION

The present invention provides a removable, protective cover for a bicycle saddle having a nose and a posterior section. The all-weather, protective bicycle saddle cover can be readily folded up and converted to a portable carrying case, which can be then clipped onto the frame of the bicycle, bicycle basket/rack, cable, seat frame, belt loop, backpack, etc.

In one embodiment, the removable bicycle saddle cover has a perimeter shape and size substantially similar to the bicycle saddle, and comprises an upper side and opposing underside, and an anterior nose section and a posterior section. The underside of the posterior section of the cover has a stretchable edge defining an opening that is sized to receive the saddle of the bicycle therethrough. The anterior nose section of the cover is in the form of a pouch that is sized to receive the nose of the bicycle saddle therein with an opening to the posterior section for insertion of the nose of the bicycle saddle into the pouch. A drawstring is secured about the edge of the opening of the anterior nose section (pouch). The posterior section can be folded into and contained within the anterior nose section (pouch) by cinching the drawstring to draw together the edges of the opening to the anterior nose section. A cord lock can be attached to the drawstring and used to secure it in a tightened state. The cover can also include a clip device such as a carabiner, that is preferably attached to the edge of the pouch and which can be clipped, for example, onto the bicycle frame, bicycle basket/rack, cable, seat frame, belt loop, backpack, etc.

The material used for fabricating the cover is preferably an "earthfriendly" (eco-friendly) waterproof material, for example, recycled PET (polyethylene terephthalate), recycled polyesters, nylons and rubbers and/or sustainable fabrics or rubbers. In the construction of the cover, in some embodiments, a top panel comprises the posterior section and anterior nose section as a unitary piece. A lower panel for the anterior nose section is joined along the edges to the top panel to form a pouch that is sized to receive the nose of the bicycle saddle therein. On the underside of the cover, the adjoining edges of the posterior section and anterior nose section define an opening for receiving the saddle therethrough.

In some embodiments, the anterior nose section and the posterior section are joined together by stitching or seaming, and the cover can be fabricated from pieces or panels of material stitched or seamed together. In other embodiments, the cover can be formed as a unitary construction (without seams), for example, as a molded flexible plastic or rubber material.

In embodiments, the stretchable edge of the posterior section is structured with a continuous elastic cord, which, when the cover is mounted onto the bicycle saddle, can be cinched to secure the cover on the saddle. A cord lock can be attached to the elastic cord and used to lock the cord in a tightened condition or release the cord when desired.

In use, the posterior section of the cover is withdrawn from the anterior nose section and the cover is mounted on the saddle of a bicycle by inserting the nose of the saddle into the anterior nose section and stretching the opposing end of the posterior section of the cover onto the saddle. The elastic cord is then cinched to tighten the edge of the posterior section of the cover on the underside of the saddle and secured with the cord lock. After use, the cover can be removed and the posterior section reinserted into the anterior nose section of the cover, which then functions as a portable and compact pouch carrying the bulk of the cover. The anterior nose section (pouch) can then be clipped, for example, onto the bicycle frame, a bicycle basket/rack, cable, seat frame, belt loop, backpack, etc. for later use.

Embodiments of the cover of the invention can be sized and configured for a saddle/seat of a bicycle and other types of similarly structured seats/saddles such as a seat/saddle of a motorcycle, scooter, watercraft, snowmobile, tractor, lawnmower, automobile and/or industrial equipment, among others.

BRIEF DESCRIPTION OF THE DRAWINGS

Preferred embodiments of the invention are described below with reference to the following accompanying drawings, which are for illustrative purposes only. Throughout the following views, the reference numerals will be used in the drawings, and the same reference numerals will be used throughout the several views and in the description to indicate the same or like parts.

FIG. 6C is a side elevational view of the cover of FIG. 6A. FIG. 6D is a rear perspective view of the cover of FIG. 6A.

FIG. 7 is a front perspective view of the anterior section of the cover of FIG. 6A as a pouch containing the posterior section of the cover.

DETAILED DESCRIPTION OF PREFERRED EMBODIMENTS

Embodiments of the invention relate to a protective cover for a saddle or seat of a bicycle.

A first embodiment of a removable cover 10 for a bicycle saddle according to the invention is described with reference to FIGS. 1-5. In this embodiment, the cover is fabricated from materials that are joined together, for example, by stitching.

Figures 1A, 1B:
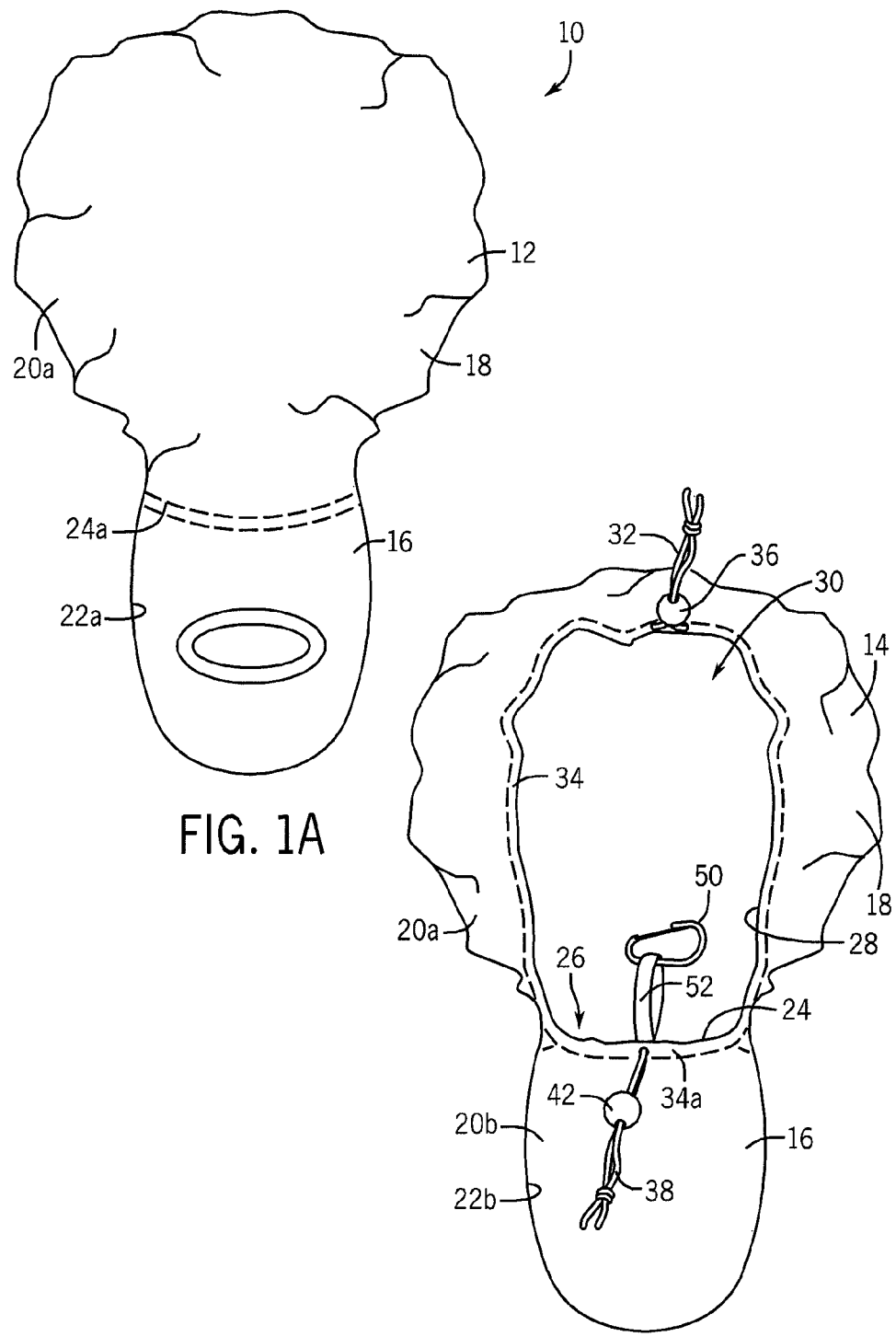
FIG. 1A is a plan view of the upper side and the underside of an embodiment of a bicycle cover of the invention.
FIG. 1B is a plan view of the underside of the cover of FIG. 1A.

The cover 10 has an upper side 12 as shown in FIG. 1A, and an underside 14 as shown in FIG. 1B, and is constructed with an anterior nose section 16 and a posterior section 18. The cover 10 can be constructed by stitching together patterned pieces of material, which are preferably eco-friendly or sustainable antimicrobial waterproof fabrics made, for example, from recycled plastic PET (polyethylene terephthalate) bottle fibers, recycled polyesters, and nylons, among other materials.

Figure 2A:
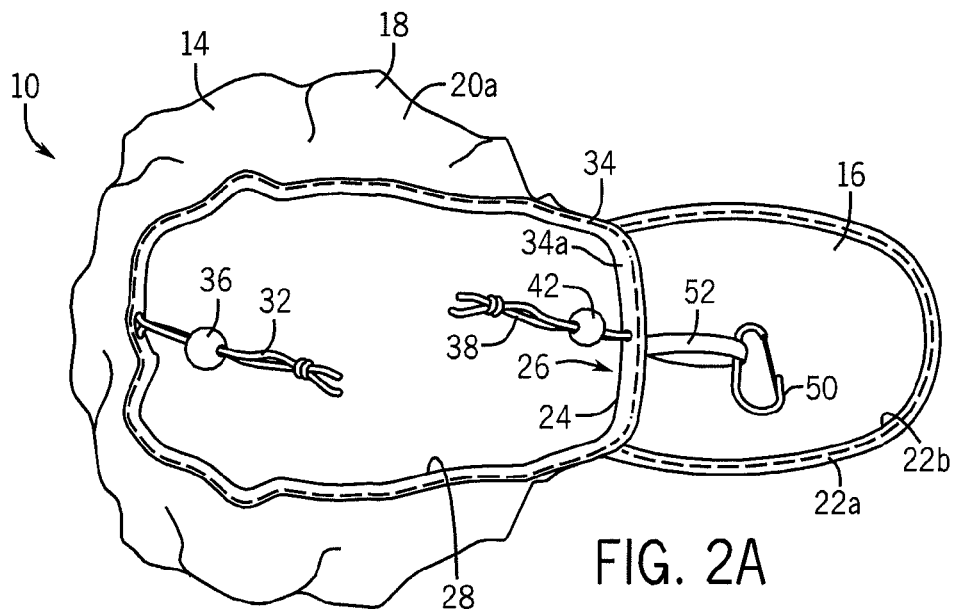
FIG. 2A is a plan view of the bicycle cover of FIG. 1A, turned inside out (inverted) to expose the stitching on the interior of the bicycle cover.
Figure 2B:
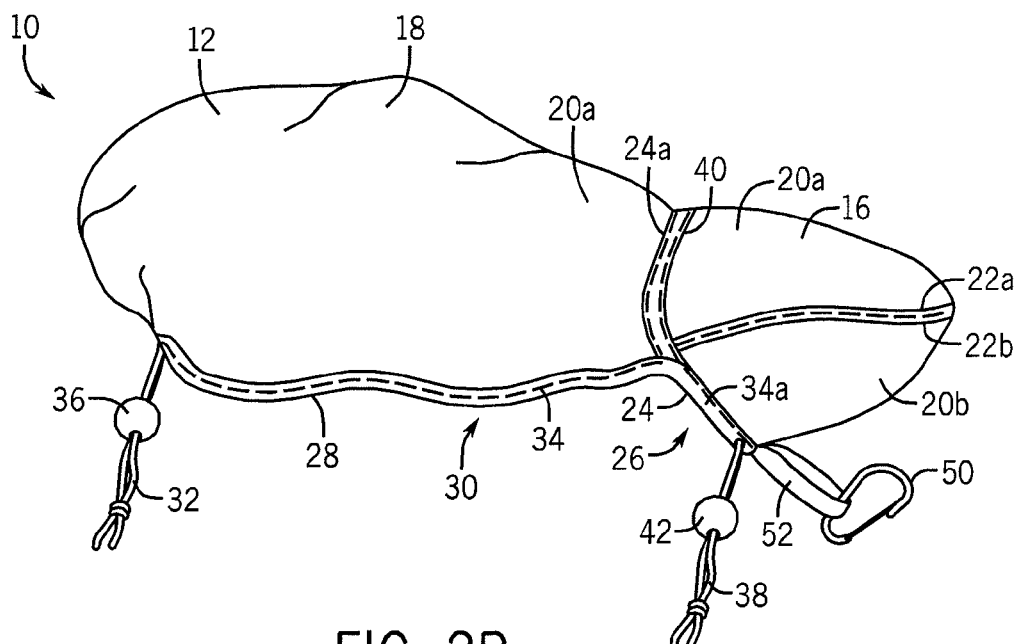
FIG. 2B is an elevated side view of the bicycle cover as shown in FIG. 2A.
Figure 3:
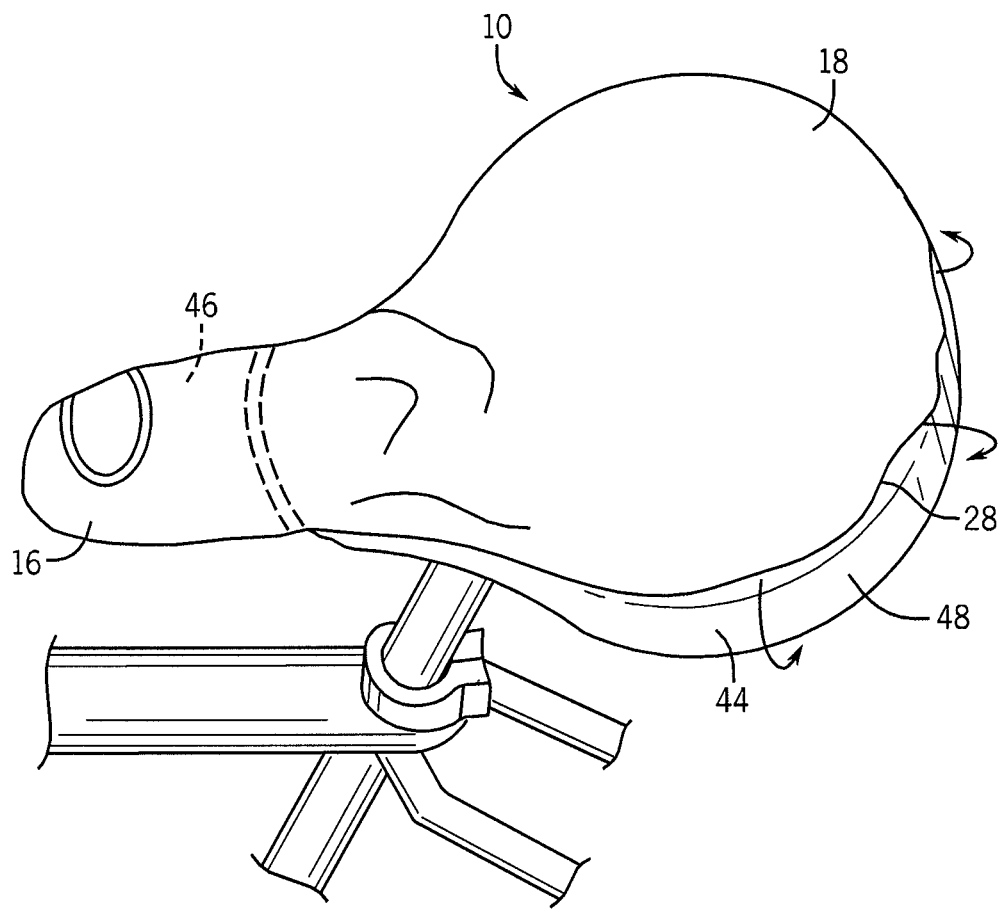
FIG. 3 is a perspective view of the bicycle cover of FIG. 1A being mounted on a saddle of a bicycle.

In the embodiment illustrated in FIG. 1A, the cover has a top panel 20a with the posterior section 18 and anterior nose section 16 as a unitary piece. Referring to FIGS. 2A to 2B showing the cover 10 turned inside out, a lower panel 20b for the anterior nose section 16 is attached to the top panel 20a by joining the side seams 22a, 22b of the top and lower panels of the anterior nose section to form a pouch with an edge 24 and an opening 26. The anterior nose section is sized and shaped to receive the nose of the bicycle saddle therein (as depicted in FIG. 3).

On the underside 12 of the cover, the adjoining edges 24 and 28, respectively of the anterior nose section and posterior section, define a circular opening 30 within the posterior section of the cover.

A continuous elasticized cord 32 is attached along the circumference of the opening 30, for example, within a casing 34 stitched along the edges 24, 28, as depicted in FIGS. 2A to 2B. The elasticized cord 32 allows the edges 24, 28 to be stretched to accommodate insertion of the bicycle saddle through the opening 30 for mounting the cover 10 onto the saddle. A cord lock 36 can be mounted on the elasticized cord 32 and manually slid along the cord to cinch or tighten it to snuggly fit the cover onto the bicycle saddle.

The cover 10 includes a drawstring or cord 38 that is attached along the circumference of the opening 26 to the anterior nose section 16. For example, the drawstring 38 can be contained within the section of the casing 34a along edge 24 and, as shown in FIG. 2B, within a second casing 40 attached (e.g., stitched) to the underside of the top panel 20a along the border 24a of the anterior nose section. A cord lock 42 can be mounted on the drawstring 38 to cinch and close the opening 26 to the anterior nose section.

Figure 4A:
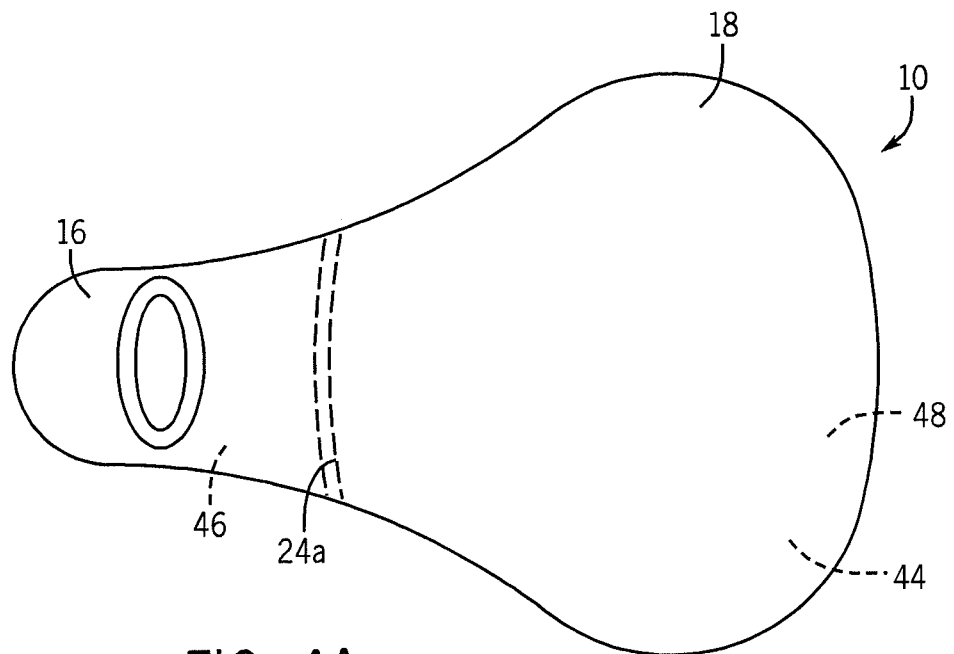
FIGS. 4A and 4B are plan views, respectively, of the upper side and underside of the bicycle saddle of FIG. 3 with the bicycle cover mounted on the saddle.
Figure 4B:
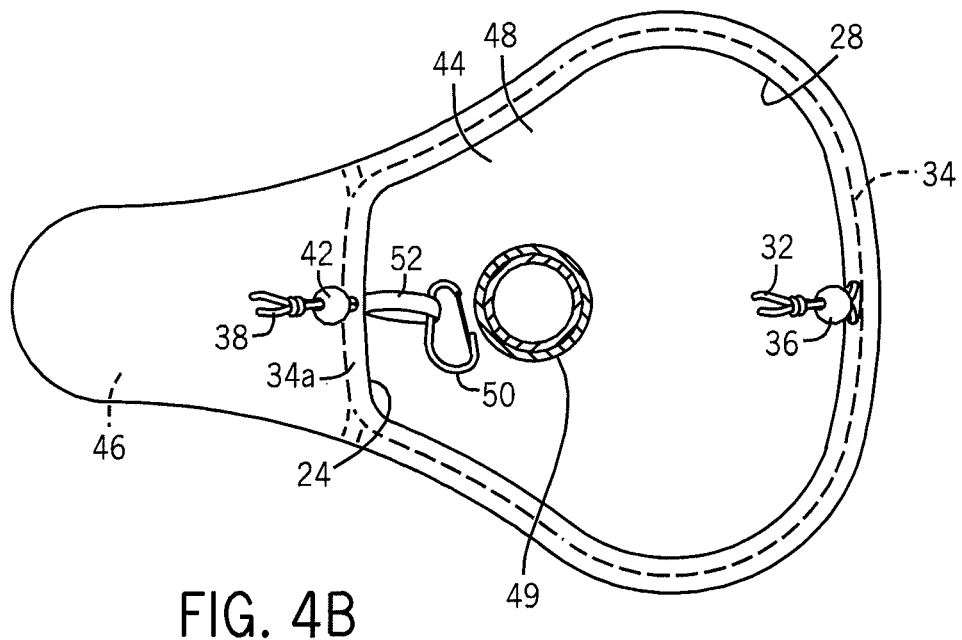

Referring to FIG. 3, in use, the cover 10 is mounted on a bicycle saddle 44 by inserting the nose 46 of the saddle into the anterior nose section 16 and pulling the cover over the posterior section 48 of the saddle (arrow) such that the elasticized edge 28 engages the underside of the saddle, as depicted in FIGS. 4A to 4B, showing the seat post 49. The elasticized cord 32 can then be cinched up to fit the cover 10 snuggly onto the saddle 44 and locked in place by engagement of the cord lock 36.

Figure 5B:
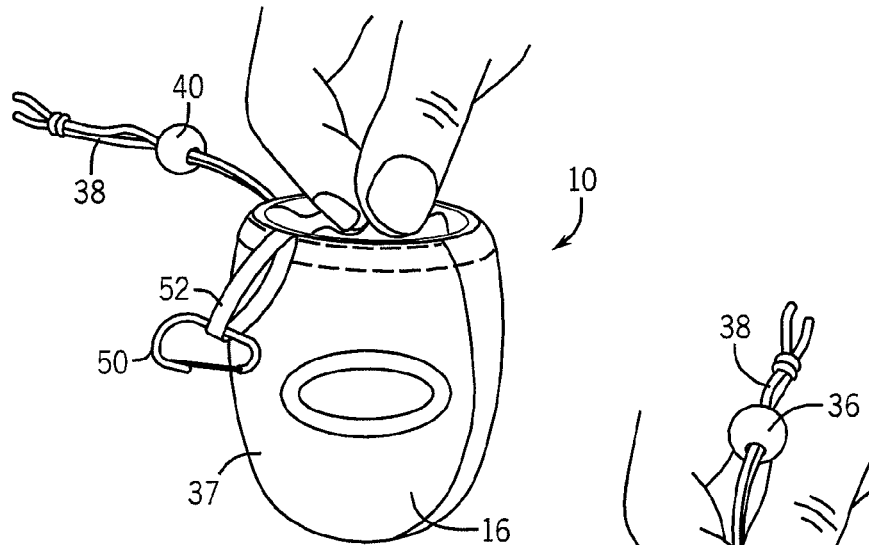
FIGS. 5A to 5B are front perspective views of the bicycle cover of FIG. 1A, illustrating the sequential insertion of the posterior section of the bicycle cover being folded into the interior of the anterior ("nose") section shown in FIG. 1A.
Figure 5A:
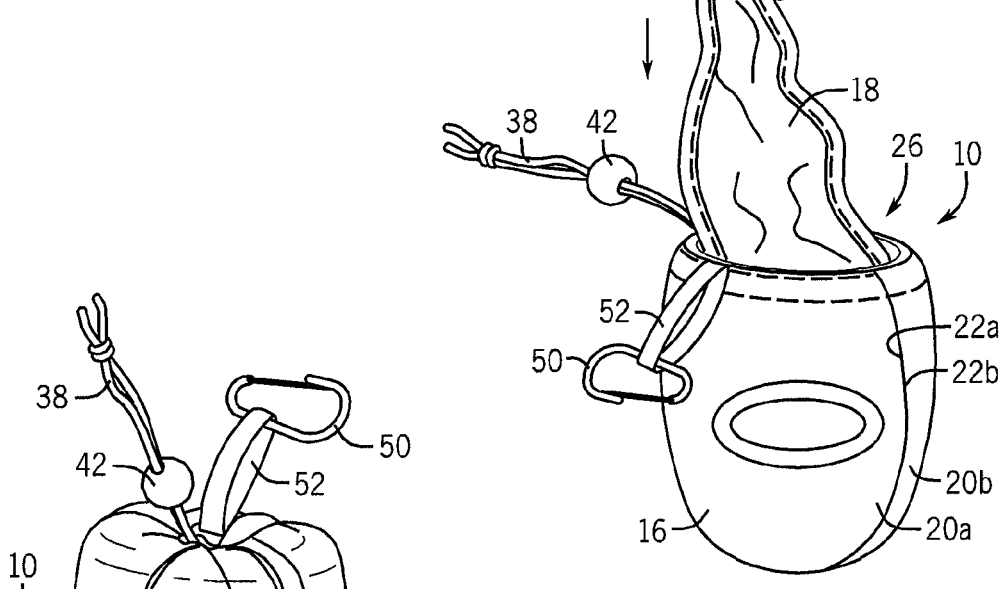
Figure 5C:
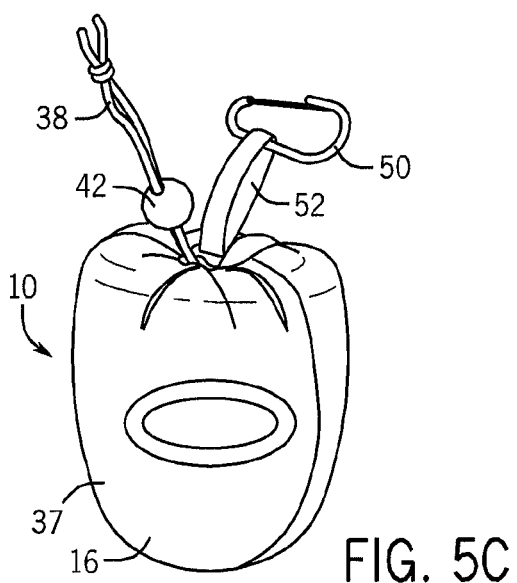
FIG. 5C is a front perspective view of the bicycle cover, illustrating the anterior (nose) section as a pouch with the posterior section contained and secured therein.

After use, the cover 10 can be removed from the bicycle saddle 44 and, as illustrated in FIGS. 5A to 5B, the posterior section 18 of the cover can be folded into the anterior nose section 16 which then functions as a pouch 37, and the drawstring 38 tightened to close the opening 26 and then secured by means of the cord lock 42. To deploy the cover 10 from the pouch 37, the cord lock 42 can be disengaged, the drawstring 38 loosened, and then the posterior section 18 withdrawn from the pouch 37. In embodiments, the cover 10 includes a clip device or member 50 such as a carabiner as illustrated, which can be fastened to a loop 52 attached to the anterior nose section 16, to clip the pouch to the bicycle frame, a bicycle basket/rack, cable, seat frame, belt loop, backpack, etc., for later use.

Figure 6A:
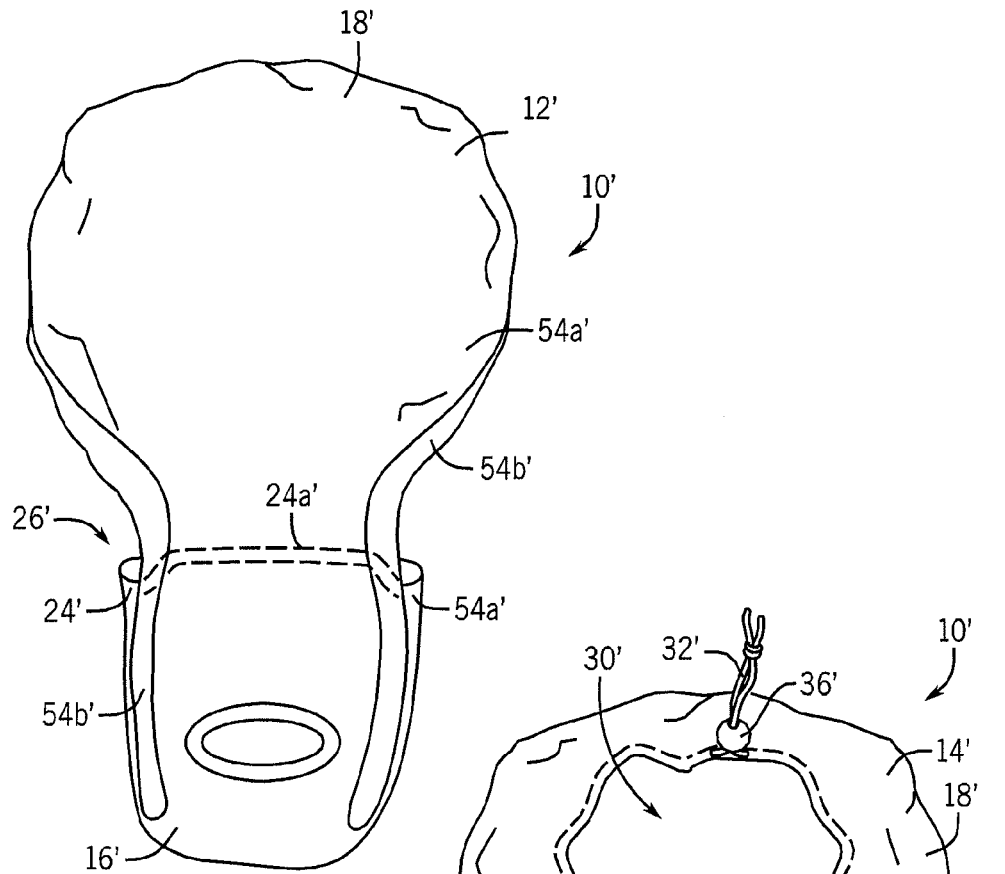
FIG. 6A is a front perspective view of another embodiment of a bicycle cover of the invention.
Figure 6B:
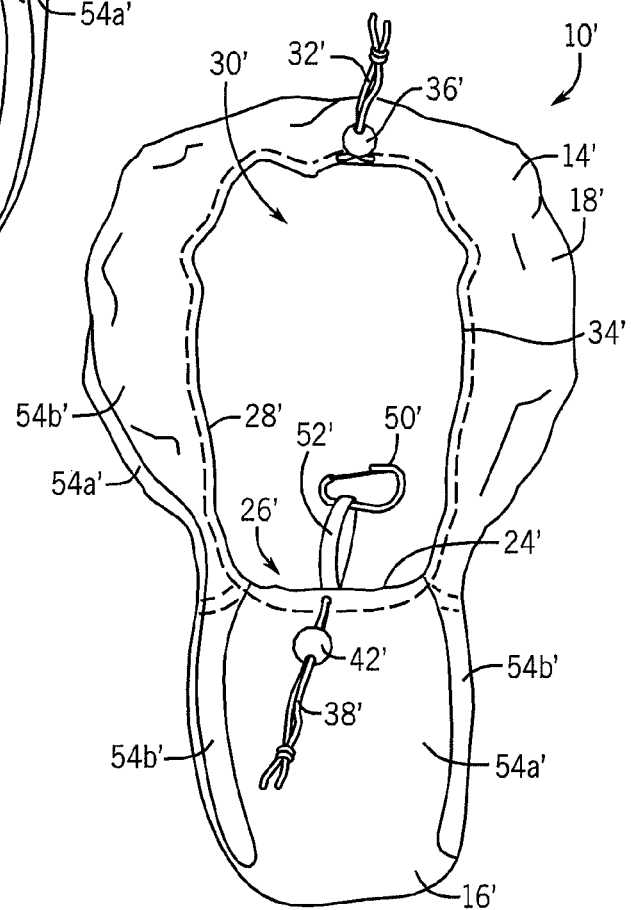
FIG. 6B is a plan view of the underside of the bicycle cover of FIG. 6A.

Another embodiment of a cover 10' for a bicycle saddle according to the invention is illustrated in FIGS. 6 to 7, which can be used, for example, with a wider cruiser-type saddle. In this embodiment, the cover 10' is structured with a top panel 54a' and a side panel 54b', which can be seamed together, for example, by stitching, as illustrated in FIGS. 6A to 6D. As depicted, the side panel 54b' forms an insert in the anterior nose section 16'. As illustrated in FIG. 7, the posterior section 18' can be folded into and contained within the anterior nose section 16' by means of the drawstring 38' and cord lock 42', and the pouch can be clipped to a bicycle frame, a bicycle basket/rack, cable, seat frame, belt loop, backpack, etc., using the attached carabiner or other clip device 50'.

Figure 8A:
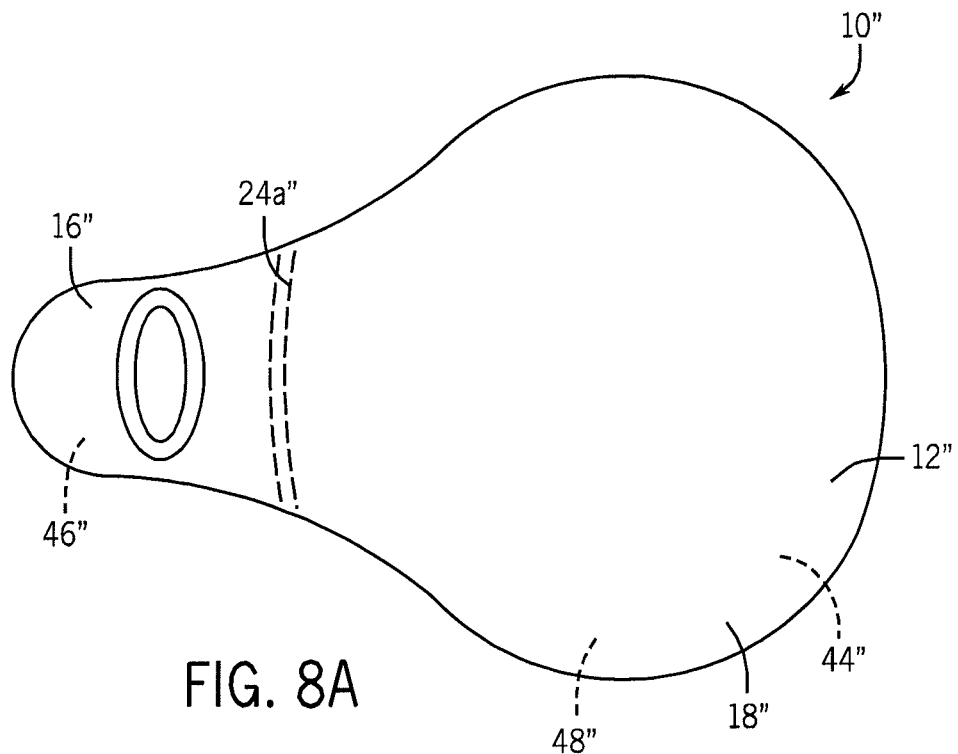
FIG. 8A is a plan view of the upper side of another embodiment of a bicycle cover of the invention.
Figure 8B:
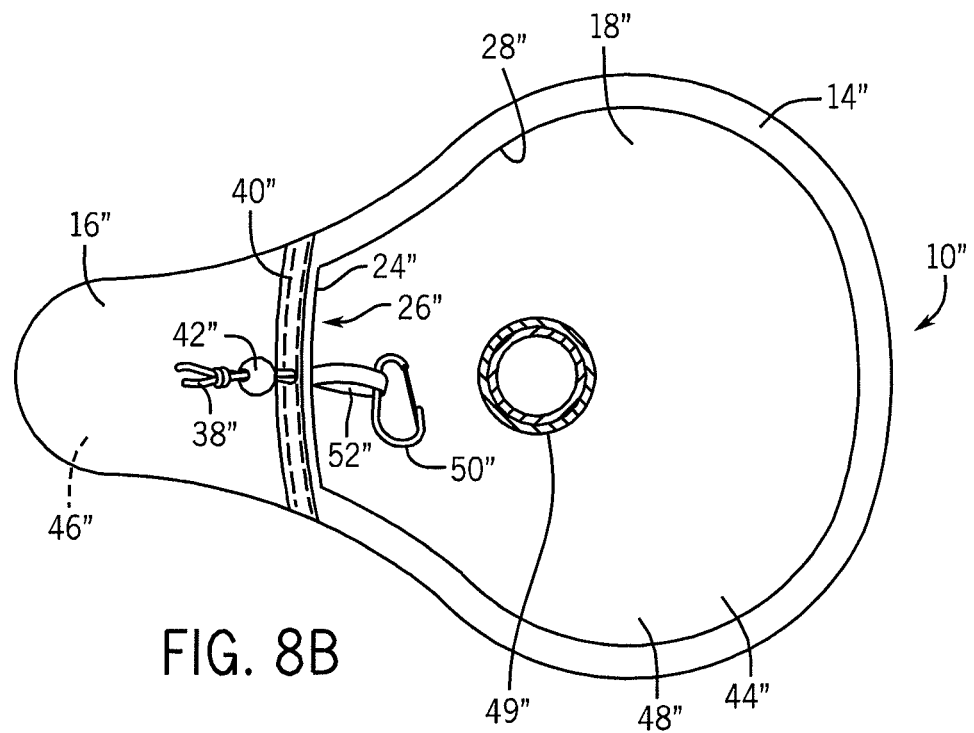
FIG. 8B is a plan view of the underside of the cover of FIG. 8A.
Figure 9:
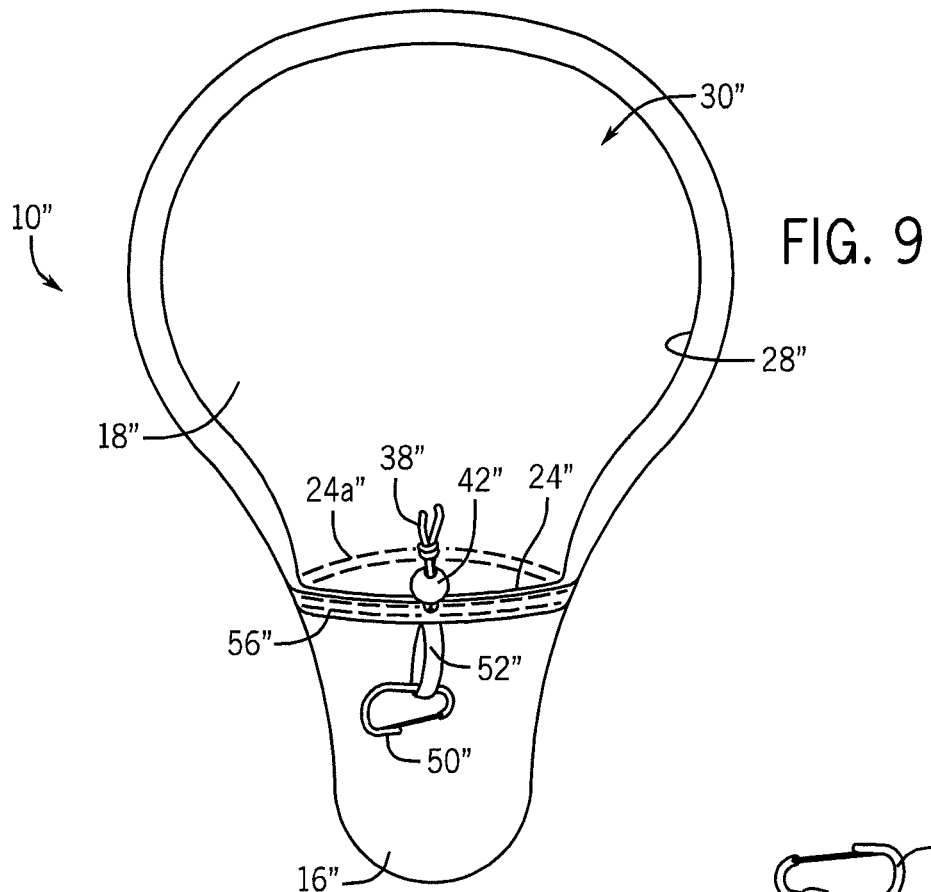
FIG. 9 is a plan view of the bicycle cover of FIG. 8A turned inside out (inverted) to expose the interior of the anterior (nose) section of the cover.
Figure 10:
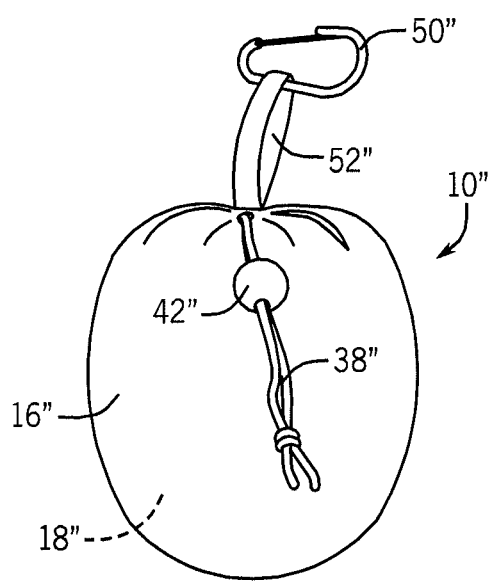
FIG. 10 is a front perspective view of the bicycle cover of FIG. 8A, illustrating the anterior (nose) section of the cover as a pouch containing the posterior section of the cover.

FIGS. 8 to 10 illustrate another embodiment of a bicycle saddle cover 10" fabricated as a unitary and continuous piece of molded rubber or stretchable material. In this embodiment, the edge 28" of the cover is elastic and stretchable and provides a sufficiently snug fit about the bicycle saddle such that an elasticized cord (e.g., 32) used for tightening the edge 28" about the bicycle saddle can be eliminated.

The cover 10" can be fabricated from a wide variety of resins using conventional molding techniques known in the art, including, for example, injection molding, compression molding, blow molding, among others. In a preferred embodiment, the cover 10" is molded or fabricated from and a recycled or sustainable rubber. The cover 10" can be molded in a shape and size that is substantially the same as the subject bicycle saddle. As depicted in FIG. 9 showing the cover 10" turned inside out, a casing 56" can be attached along edge 24" and the inside surface of the cover along the border 24a" of the anterior nose section to enclose the drawstring 38".

Similar to the other embodiments, the posterior section 18"can be inserted into the anterior nose section 16" and secured inside by cinching the drawstring 38" and securing the cord lock 42", as depicted in FIG. 10.

All embodiments of the cover can be produced in a size to accommodate the size and configuration of the bicycle saddle to be covered, including, for example, average sized comfort saddles, racing saddles, cruiser sized saddles and youth sized saddles, among others, and other types of similarly structured seats/saddles including, for example, ATV, motorcycle and scooter seats, watercraft and snowmobile seats, tractor and lawn equipment seats, automotive and industrial equipment seats, among others.

The invention has been described by reference to detailed examples and methodologies. These examples are not meant to limit the scope of the invention. It should be understood that variations and modifications may be made while remaining within the spirit and scope of the invention, and the invention is not to be construed as limited to the specific embodiments disclosed. The disclosures of references cited in the application are incorporated by reference herein.

What is claimed:

1. A removable cover for a bicycle saddle having a nose and a posterior section, the cover having a perimeter shape and size substantially similar to the bicycle saddle, and comprising:
   an upper side and opposing underside, and an anterior nose section joined to a posterior section;
   the underside of the posterior section of the cover having a stretchable edge defining an opening sized to receive the saddle therethrough;
   the anterior nose section of the cover in the form of a pouch sized to receive the nose of the bicycle saddle therein, with an opening to the anterior nose section for insertion of said nose of the bicycle saddle therethrough and into the pouch, and a drawstring secured about an edge of said opening to the anterior nose section;
   wherein the posterior section is foldable into the pouch and containable therein by cinching the drawstring to draw together the anterior nose section along the opening to the anterior nose section.

2. The cover of claim 1, wherein the stretchable edge of the posterior section comprises a continuous elastic cord and the cover can be secured to the bicycle saddle by cinching the elastic cord.

3. The cover of claim 2, further comprising a cord lock attached to the elastic cord.

4. The cover of claim 1, wherein the anterior nose section and the posterior section are joined by stitching together a portion of the edges of said sections.

5. The cover of claim 4, comprising pieces of material stitched together.

6. The cover of claim 1, comprising a waterproof material.

7. The cover of claim 1, comprising a plastic material.

8. The cover of claim 1, wherein the edge defining the opening within the posterior section of the cover comprises a section of the edge of the anterior nose section joined to a section of the edge of the posterior section.

9. The cover of claim 1, wherein the anterior nose section and the posterior section are a unitary molded rubber construction.

10. The cover of claim 1, further comprising a cord lock attached to the drawstring.

11. The cover of claim 1, further comprising a clip member attached to the edge of the anterior nose section.

12. The cover of claim 11, wherein the clip member is a carabiner.

13. A removable cover for a saddle having a nose and a posterior section, the cover having a perimeter shape and size substantially similar to the saddle, and comprising:
   an upper side and opposing underside, and an anterior nose section joined to a posterior section;
   the underside of the posterior section of the cover having a stretchable edge defining an opening sized to receive the saddle therethrough;
   the anterior nose section of the cover in the form of a pouch sized to receive the nose of the saddle therein, with an opening to the anterior nose section for insertion of said nose of the saddle therethrough and into the pouch, and a drawstring secured about an edge of said opening to the anterior nose section;
   wherein the posterior section is foldable into the pouch and containable therein by cinching the drawstring to draw together the anterior nose section along the opening to the anterior nose section.

14. The cover of claim 13, being sized and configured for a saddle of an apparatus selected from the group consisting of a bicycle, motorcycle, scooter, watercraft, snowmobile, tractor, lawnmower, automobile, and industrial equipment.

* * * * *